Dec. 11, 1951  L. A. MINDRUP  2,578,482
INSECT POISONING AND CROP DUSTING MACHINE
Filed July 2, 1945  3 Sheets-Sheet 1
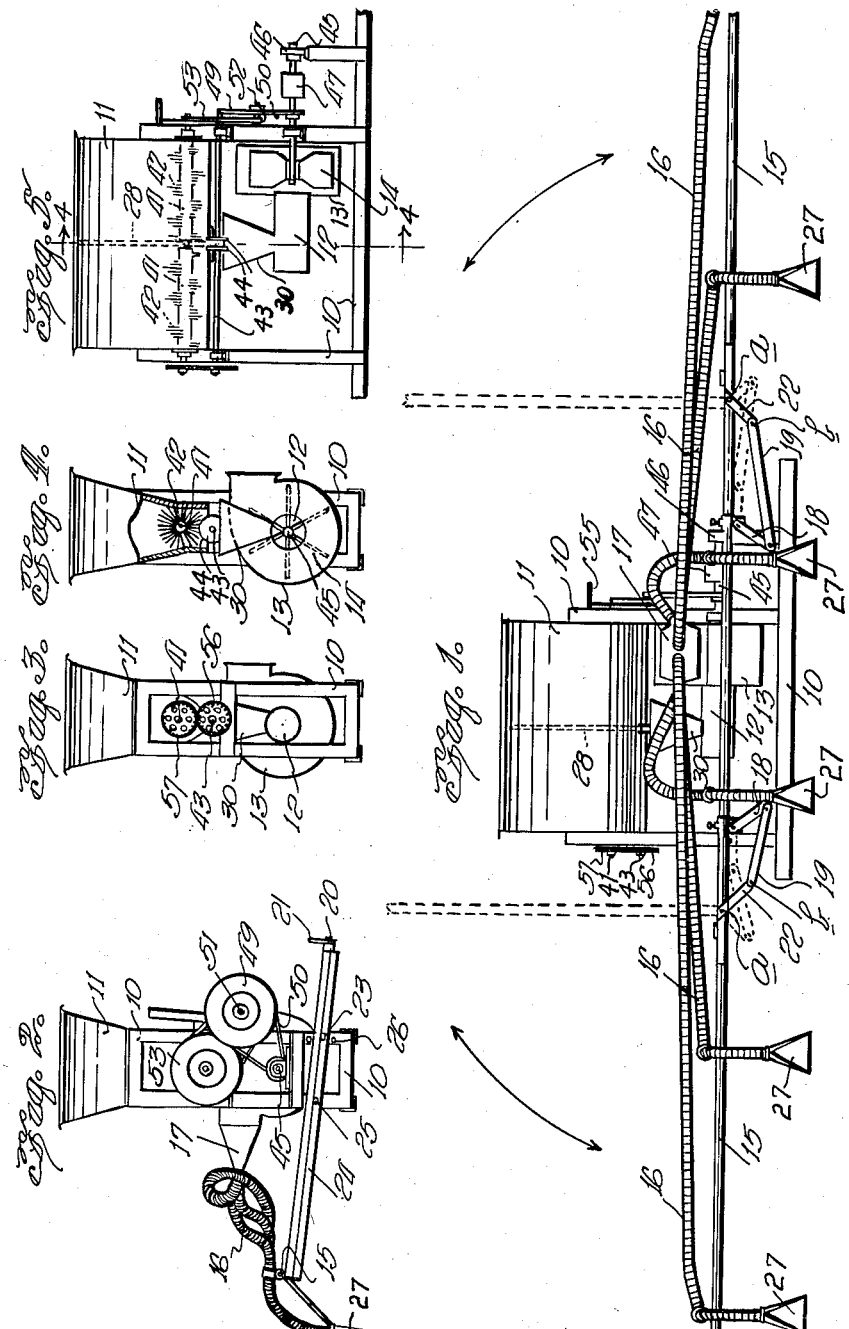
LOUIS A. MINDRUP INVENTOR Dec. 11, 1951 L. A. MINDRUP 2,578,482
INSECT POISONING AND CROP DUSTING MACHINE
Filed July 2, 1945 3 Sheets-Sheet 2
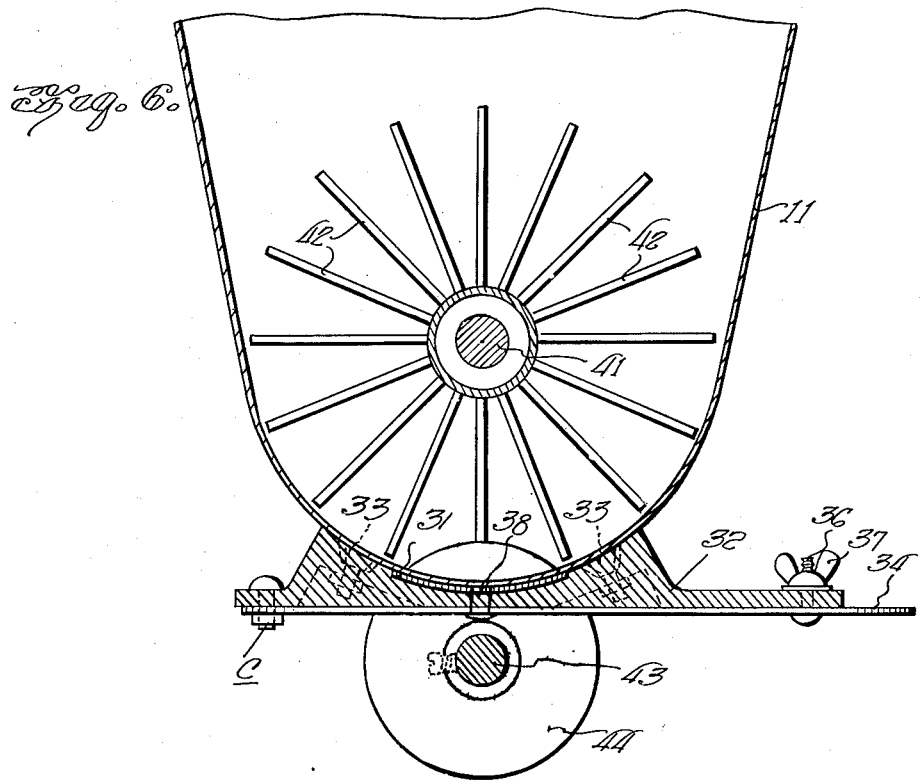
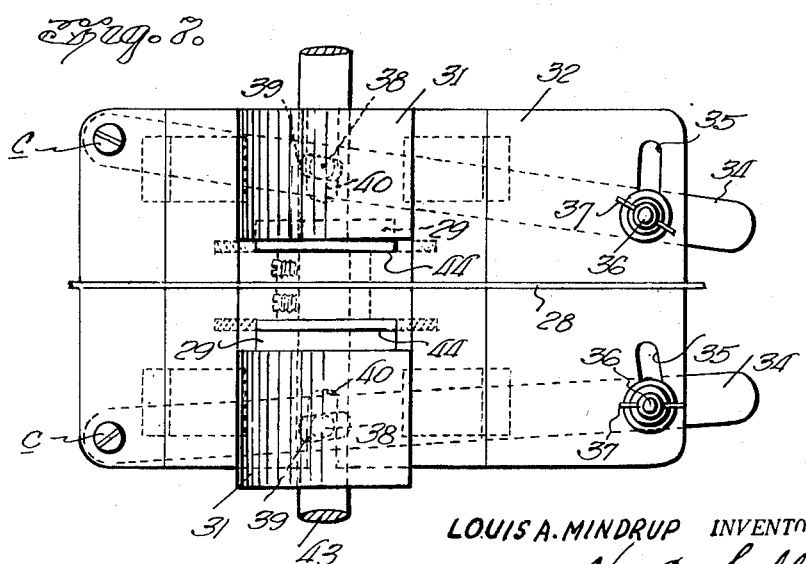
LOUIS A. MINDRUP INVENTOR.

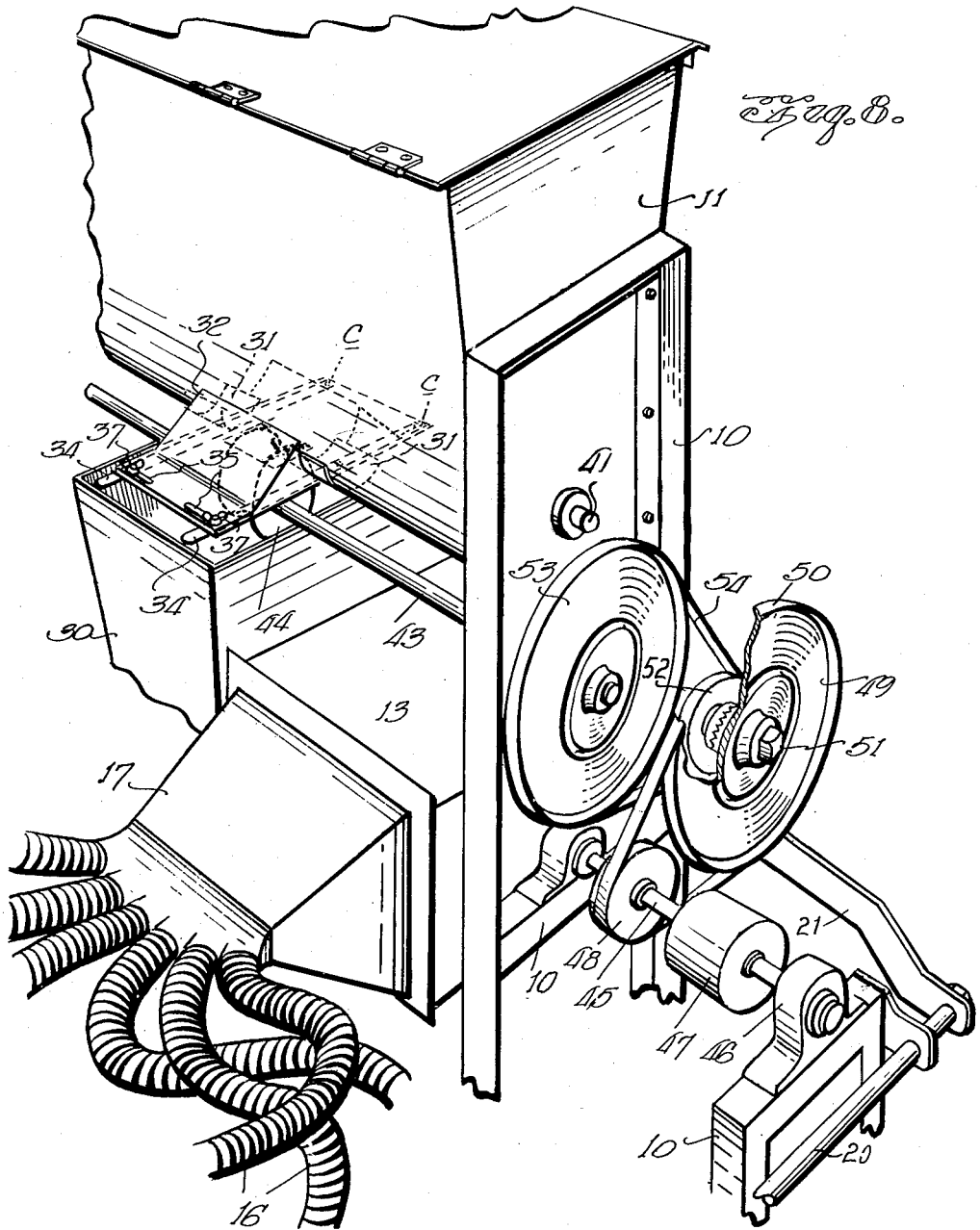

Patented Dec. 11, 1951

2,578,482

UNITED STATES PATENT OFFICE 2,578,482

INSECT POISONING AND CROP DUSTING MACHINE

Louis A. Mindrup, Dallas, Tex.

Application July 2, 1945, Serial No. 602,907

17 Claims. (Cl. 222—314)

1

This invention relates to insect poisoning apparatus and more particularly to crop dusting machines.

The principal object of the invention is to provide a machine for the application of insecticides to any type of farm crops such as cotton, potatoes, peanuts, nursery stock and many kinds of vegetables to defeat the destructiveness of insects such as boll weevils, flea hoppers, fall army worms and many others. The machine is constructed as an attachment to any type of farm tractor and is capable of ready attachment and detachment.

Another and equally important object of the invention is to provide a dusting machine having a hopper provided with two or more compartments adapted to contain different insecticides and, by virtue of an assembly consisting of right and left hand conveyors in the compartments, valves individual to each compartment and a blower, material may be delivered to the blower in predetermined quantities from each compartment, to be mixed in and discharged from the blower housing in proper proportions and directed onto the plants by nozzles mounted on flexible conduits communicating with the blower housing.

Another object of the invention is to provide an improved type of dust feeding mechanism, broadly defined as a valve in the foregoing but which consists specifically of a machined disc operating partially in a compartment of the hopper, against which the material is urged by a conveyor, to be carried thereby into the blower housing, the quantity of material thus displaced being determined through the medium of a sliding gate, movable in relation to the disc and lever controlled by the operator of the tractor.

With the foregoing objects as paramount, the invention has further reference to certain features of accomplishment which will become apparent as the description proceeds, taken in connection with the accompanying drawings wherein:

Figure 1 is a front elevational view of a crop dusting attachment for tractors, embodying the invention.

Figure 2 is an end elevational view.

Figure 3 is an elevational view of the end of the machine opposite to that shown in Figure 2.

Fig. 4 is a sectional view on the line 4—4 of Fig. 5, certain parts being shown in end elevation.

Figure 5 is a front elevational view of the machine with certain parts omitted, and with the fan casing shown in section to reveal the interior.

2

Figure 6 is an end view of the hopper and feeding assembly in vertical section.

Figure 7 is a plan view of the feeding assembly per se, and

Figure 8 is a fragmentary perspective view showing the hopper, main drive and dust distributing conduits.

The present invention, through the novel expedient of providing for the mixing and simultaneous distribution of more than one form of poison, will effect a material saving in the cost of handling the chemicals used, such as sulphur, calcium arsenate, copper dust, cryolite, and other well known ingredients, and there is an added advantage in that provision is made to vary proportions of chemicals to suit the requirements during actual dusting operations. When dusting with only one type of insecticide, both compartments of the hopper may be utilized, thus adding to the capacity of the machine.

Continuing with a more detailed description of the drawing, reference is primarily made to Figure 1 wherein numeral 10 denotes the elements of a frame for supporting a hopper 11, a collecting chamber 12, a fan housing 13, fan 14 and other elements to be specifically described later.

Supported also by the frame 10 is a sectional boom 15, mounted rearwardly of the machine and which is of sufficient length to accommodate six or eight lengths of metal hose 16, communicating with an adapter housing 17 of the fan housing 13. This boom is of steel pipe construction and its sections are hinged at a, Figure 1, in order that they may be raised to the perpendicular position shown in dotted lines in this figure, so that they may not come in contact with obstructions such as fences at the ends of rows. This is accomplished by means of relatively pivoted links 18 and 19, the former being affixed to a shaft 20, carrying a lever 21 (Fig. 2), accessible to the tractor operator. The link 19 is pivotally joined at b to an arm extension 22 of the boom section and when the shaft 20 is rotated, link 18 moves link 19 to impose a thrust on arm 22 to raise the boom section 15. The boom sections are automatically retained in upright position when the pivot point b passes dead center and will accordingly remain in this position until the operator of the tractor actuates lever 21 to lower them.

The boom sections are made adjustable for height of different crops by loosening bolt 23 (Fig. 2) and allowing the angle iron boom support 24 to be raised or lowered on pivot 25 and rebolted in place. These bolts are passed through holes 26 in the frame 10, which are struck from pivot center 25.

The nozzles 27 on the delivery ends of each of the hose sections 16 are of conventional design.

Returning to the hopper 11 and its associated parts, it will be observed in Figures 1 and 5, and in Figure 7 that the hopper is divided by a partition 28 into two compartments which may contain the same or different insecticides. These compartments have separate discharge openings 29 (Fig. 7) in their bottoms which communicate with a common hopper 30, the latter, in turn, communicating with the receiving chamber 12, next adjacent to and serving the fan housing 13 which becomes the mixing chamber for chemicals of different characteristics deposited into the receiver 12 from the separate chambers of the hopper 11.

To control the quantity of material fed from the compartments of the hopper 11, a sliding gate 31 is provided for each discharge opening 29. These gates are of concavo-convex form to slidably lie in recesses of corresponding shape made in a casting 32, secured by means of bolts 33 to the bottom of hopper 11. In Figure 7, one of the gates 31 is in a position to close its feeder opening 29 while the companion gate is disposed to partially close the companion opening 29.

To actuate these gates, a lever 34 is provided for each. Each lever is pivoted at c to the underside of the casting 32 so that its opposite end may be manipulated from side to side by the tractor operator, the limit of displacement thereof being controlled by slots 35 in the casting 32, through which extend wing bolts 36, carrying wing nuts 37 for ease in securing the levers 34 in adjusted positions. Depending from the gates 31 are pins 38, entering slots 39 in the levers 34 and slots 40 in the casting 32. It is apparent that when the extended ends of the levers 34 are moved back and forth, their engagement with gates 31 through pins 38 will cause the gate 31 to be similarly moved to open or close the feeder openings 29, thereby varying the amounts of material passing therethrough.

To insure proper movement of material to and through the feeder openings 29, a rotatable element is arranged in the hopper serving the dual purpose of agitating the powdered poison and conveying the same towards the openings 29. This element consists of a shaft 41 extending entirely through the hopper 11, from which extends radially a series of arms 42. Inasmuch as there are two compartments in the hopper with feeder openings adjacent the intermediate partition 28, it is expedient to spirally mount the arms 42 on the shaft 41 and make them right and left to insure conveyance of material towards the center of the hopper so that it will be in a position to drop through the openings 29.

Mounted on a shaft 43 extending longitudinally of and below the hopper 11 are a pair of plain machined discs 44 whose upper portions extend into the feeder openings 29 and against which material in the compartments of the hopper is urged by the conveyor arms 42. These discs serve to move the material out of the compartments, through the openings 29, into the small hopper, from which it is drawn by the fan 14 into the receiving chamber 12, thence into the fan housing 13 and discharge through each of the several hose sections 16 directly onto the rows of plants.

To drive the mechanism described, the shaft 45 on which the fan 14 is mounted extends from the fan housing and is journaled in a bearing 46 (Fig. 8) mounted on the frame 10. This shaft carries a pulley 47 which is driven by a belt (not shown) which in turn may be driven from the side power-take-off of the tractor on which the dusting machine is mounted. The shaft 45 also carries a sheave 48 which drives a larger sheave 49 through a belt 50. The larger sheave 49 drives a shaft 51, carrying a small sheave 52 (Fig. 5) which drives a larger sheave 53, mounted on shaft 43, through belt 54. Thus, the feeder discs 44, mounted on this shaft 43, are driven. A lever 55 (Fig. 1) is provided to actuate a clutch to disengage sheave 52 from the driven shaft 51 when it is desired to stop the feeding assembly, such as at turning points at the ends of rows.

The conveyor shaft 41 is driven in the manner shown in Figure 3, i. e., by enmeshing gears 56 and 57, the former being mounted on the end of shaft 43 while the latter gear is mounted upon the conveyor shaft 41. The travel of the conveyor 42 is driven to coincide with the travel of the discs 44 through the medium of these gears 56 and 57.

Inasmuch as the functon of each individual element has been clearly set forth in the foregoing, a separate explanation of the operation of the machine as a whole is rendered unnecessary.

Manifestly, the construction as shown and described is capable of some modification and such modification as may be construed to fall within the scope and meaning of the appended claims is also considered to be within the spirit and intent of the invention.

What is claimed is:

1. A crop dusting machine comprising a hopper having a rounded bottom provided with at least one pair of spaced elongated outlet openings, a partition intermediate the openings providng separate dust compartments, means including a pair of discs each having a peripheral portion rotating in one of said openings for discharging dust therefrom, a receiving chamber arranged to receive dust from both said openings, and means, including a suction fan having its intake pipe communicating with said common receiving chamber, for mixing and discharging mixed dust from said common chamber.

2. In a crop dusting machine, a dust hopper having an elongated discharge opening in the bottom thereof, dust feeding means, comprising a vertical smooth faced disc having a plain periphery, coacting with said opening for discharging dust therethrough, and means, comprising an adjustable slide movable toward or away from a face of the disc, for varying the size of the opening.

3. In a crop dusting machine, a dust hopper having an elongated discharge opening in the bottom thereof, a plain vertically mounted feeder disc coacting with said opening for discharging dust therethrough, having one face positioned adjacent one longitudinal edge of the opening, and means comprising a transversely adjustable slide movable toward or away from the opposite face of said disc for varying the width of the opening beyond the disc.

4. In a crop dusting machine, a dust hopper having a curved bottom provided with an elongated outlet opening therein, a vertically mounted smooth faced feeder disc cooperating with said opening for discharging a measured quantity of dust therethrough, positioned adjacent one edge of the opening, and means comprising a curved transversely adjustable slide for varying the width of the opening beyond the disc.

5. In a crop dusting machine, a dust hopper having an elongated discharge opening in the bottom thereof, a vertically mounted smooth faced feeder disc coacting with said opening for discharging dust therethrough, having one face positioned adjacent one longitudinal edge of the opening, means comprising a transversely adjustable slide movable toward and away from the opposite face of the disc for varying the width of the opening beyond the disc, and an actuating link for adjusting said slide.

6. In a crop dusting machine, a dust hopper having an elongated discharge opening in the bottom thereof, a vertically mounted smooth faced feeder disc coacting with said opening for discharging dust therethrough, having one face positioned adjacent one longitudinal edge of the opening, and means comprising a transversely adjustable slide movable toward and away from the opposite face of the disc for varying the width of the opening beyond the disc, the periphery of the feeder disc being plain.

7. In a crop dusting machine, a dust hopper having an elongated discharge opening in the bottom thereof, a vertically mounted smooth faced feeder disc coacting with said opening for discharging dust therethrough, having one face positioned adjacent one longitudinal edge of the opening, and means comprising a transversely adjustable slide movable toward and away from the opposite face of the disc for varying the width of the opening beyond the disc, the periphery of said disc being plain, and the fit between said disc, the slide and said discharge opening being such that the discharge of dust may be cut off when the slide is moved substantially into contact with said disc.

8. In a crop dusting machine, a dust hopper having transversely spaced elongated outlet openings in the bottom thereof, means for feeding dust to said outlet openings, a vertically mounted smooth faced feeder disc coacting with each said opening for discharging dust therefrom, one face of each disc snugly fitting one longitudinal edge of its opening, means, comprising transversely adjustable slides movable toward and away from the opposite face of its respective disc, for varying the width of the openings beyond the discs, a receiving hopper below said opening, and means for mixing and discharging the dust from said receiving hopper.

9. In a crop dusting machine, a dust hopper having transversely spaced elongated outlet openings in the bottom thereof, means for feeding dust to said outlet openings, a vertically mounted smooth faced feeder disc coacting with each said opening for discharging dust therefrom, one face of each disc snugly fitting one longitudinal edge of its opening, means, comprising transversely adjustable slides each movable toward and away from the opposite face of its respective disc, for varying the width of the openings beyond the discs, and independent adjusting means for each slide.

10. In a crop dusting machine, a dust hopper having transversely spaced elongated outlet openings in the bottom thereof, means for feeding dust to said outlet openings, a feeder disc coacting with each said opening for discharging dust therefrom, each disc snugly fitting one longitudinal edge of its opening, means, comprising transversely adjustable slides, for varying the width of the openings, a receiving hopper located below said openings, and means, including a suction fan, for mixing and discharging the dust from said receiving hopper.

11. A dust distributor comprising a dust hopper having an elongated opening in the bottom thereof, dust discharging means comprising a thin vertically mounted smooth faced disc having a smooth periphery coacting with said opening and snugly fitting one edge of the opening, and slide means movable toward and away from the opposite face of the disc for adjusting said opening.

12. A dust distributor comprising a dust hopper having an elongated opening in the bottom thereof, dust discharging means comprising a thin vertically mounted smooth faced disc having a smooth periphery coacting with said opening and snugly fitting one edge of the opening, slide means movable toward and away from the opposite face of the disc for adjusting said opening, and means independent of the disc for feeding dust in a horizontal direction through the hopper toward said disc.

13. A dust distributor comprising a dust hopper having a relatively large rectangular bottom opening therein, a thin vertically mounted smooth faced disc having a plain periphery coacting with said opening for discharging dust therefrom, said disc being positioned adjacent one edge of the opening, and slide means movable toward and away from the opposite face of the disc for regulating the size of the opening on the opposite side of the disc from said edge.

14. A dust distributor comprising a dust hopper having a relatively large rectangular bottom opening therein, a thin vertically mounted smooth faced disc having a plain periphery coacting with said opening for discharging dust therefrom, said disc being positioned adjacent one edge of the opening, slide means movable toward and away from the opposite face of the disc for regulating the size of the opening on the opposite side of the disc from said edge, and means within the hopper independent of said disc for feeding dust in a horizontal direction through the hopper toward said disc.

15. A dust distributor comprising a dust hopper having an elongated opening in the bottom thereof, and dust discharging means comprising a thin plain disc mounted for rotation about a horizontal axis located below the hopper, a portion only of the periphery of said disc extending through the opening and into the hopper, and slide means movable toward and away from said disc in a direction parallel to said axis for adjusting said opening.

16. A dust distributor comprising a dust hopper having an elongated opening in the bottom thereof, dust discharging means comprising a thin plain disc mounted for rotation about a horizontal axis located below the hopper, a portion only of the periphery of said disc extending through the opening and into the hopper, slide means movable toward and away from said disc in a direction parallel to said axis for adjusting said opening, and separate means within the hopper for conveying dust horizontally toward the disc.

17. A dust distributor comprising a dust hopper having an opening in the bottom thereof spaced from one end of the hopper and having a rectilinear edge, a thin vertically mounted smooth faced disc extending partially into said hopper, mounted for rotation about a horizontal axis below the hopper and snugly fitting said rectilinear edge of the opening, conveyor means within the hopper for feeding dust horizontally thereof toward the opening, and slide means movable toward and away from the face of the disc opposite said rectilinear edge for adjusting said opening.

LOUIS A. MINDRUP.

REFERENCES CITED

The following references are of record in the file of this patent:

UNITED STATES PATENTS

| Number | Name | Date |
|---|---|---|
| 27,390 | Selby | Mar. 6, 1860 |
| 208,657 | Williams | Oct. 1, 1878 |
| 262,498 | Strayer | Aug. 8, 1882 |
| 281,317 | Stock | July 17, 1883 |
| 582,162 | Jones | May 4, 1897 |
| 598,815 | Richter | Feb. 8, 1898 |
| 836,573 | Gourdin | Nov. 20, 1906 |
| 990,762 | McKnight | Apr. 25, 1911 |
| 1,096,785 | Jensen | May 12, 1914 |
| 1,373,317 | Edwards | Mar. 29, 1921 |
| 1,406,233 | Sheldon | Feb. 14, 1922 |
| 1,444,648 | Willis et al. | Feb. 6, 1923 |
| 1,593,517 | Tharrington | July 20, 1926 |
| 1,736,124 | Meijer | Nov. 19, 1929 |
| 2,065,717 | Marlsdale | Dec. 29, 1936 |